Oct. 15, 1963 B. S. O. ALMÉN Re. 25,461
TOOL HOLDER
Original Filed Oct. 10, 1960 2 Sheets-Sheet 1
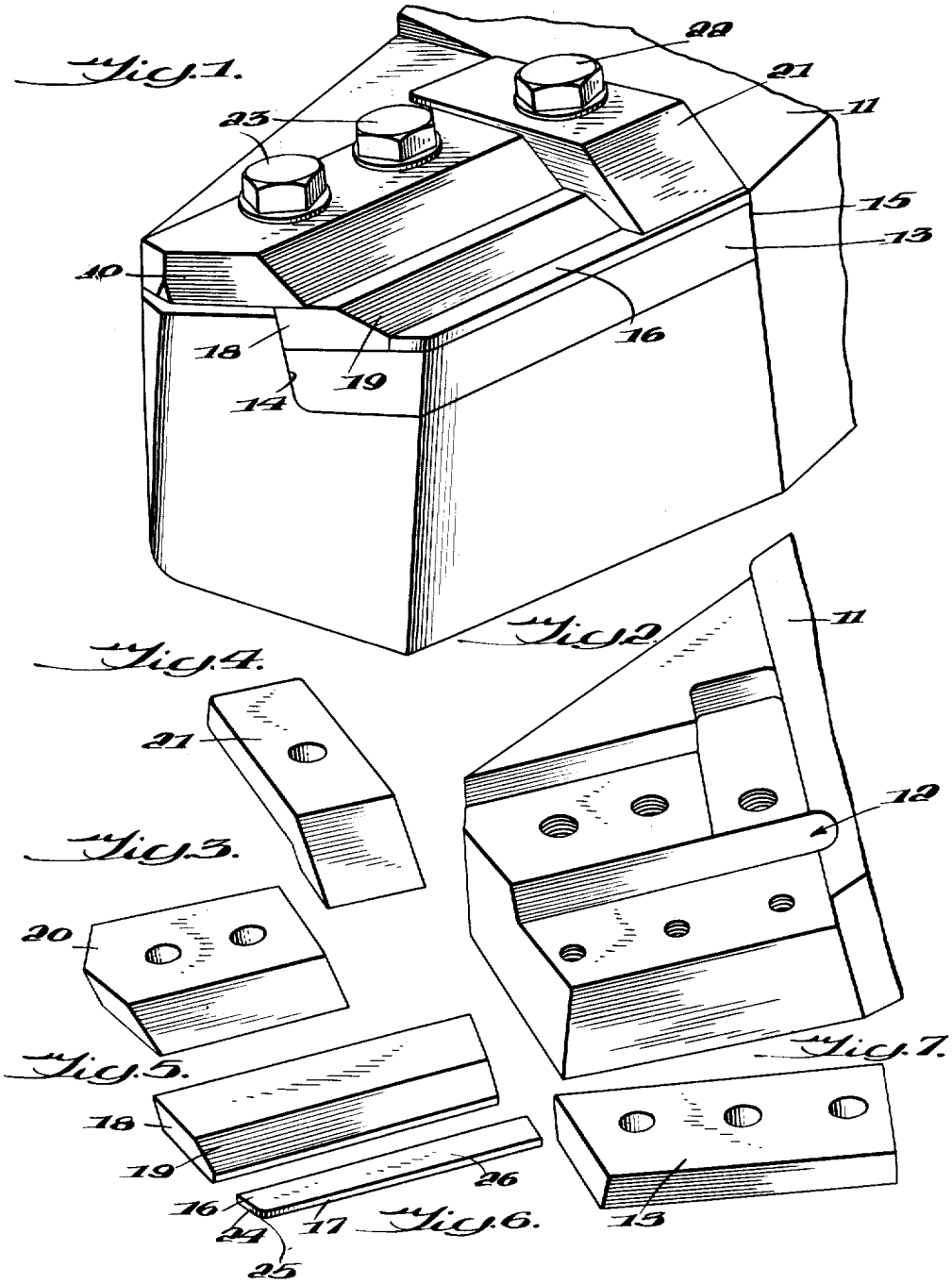

TOOL HOLDER

Original Filed Oct. 10, 1960 2 Sheets-Sheet 2

United States Patent Office

Re. 25,461
Reissued Oct. 15, 1963

25,461
TOOL HOLDER

Bengt Sven Olof Almén, Forsbacka, Sweden, assignor to Sandvikens Jernverks Aktiebolag, Sandviken, Sweden, a corporation of Sweden Original No. 3,028,657, dated Apr. 10, 1962, Ser. No. 61,522, Oct. 10, 1960. Application for reissue Aug. 29, 1962, Ser. No. 220,342
Claims priority, application Sweden Oct. 8, 1959
3 Claims. (Cl. 29—96)

Matter enclosed in heavy brackets [ ] appears in the original patent but forms no part of this reissue specification; matter printed in italics indicates the additions made by reissue.

The present invention relates to tool holders for chip cutting operations, e.g. turning and planing tool holders and milling cutters, having mechanically clamped inserts, preferably of sintered material.

When tool holders of the conventional kind with thick and relatively short inserts are used, the inserts will be subjected to bending stresses caused by local heating and expansion. This involves the risk of cracking if the rupture limit is attained. If an insert is relatively thick it can not easily bend under influence of local or uneven heating. Instead pressure stresses will arise in the heated part, which may cause cracking and consequently rupture of the insert.

The tool holder and cutting insert combination according to the present invention provide a solution to this problem. It is characterized in that the cutting insert is long and narrow and thin, the length being several times the width and the thickness being substantially less than the width. It is further characterized in that at least one end portion of the insert is provided with a side cutting edge extending lengthwise of the insert, the top face or surface being on a broadside of the insert, while the other end portion of the insert constitutes a fastening part which is fastened in the tool holder with a mechanical clamping device. At least that end of the insert which carries the cutting edge is provided with at least two plane surfaces which are at an angle of from 45° to 120° to each other in direction across the insert, which surfaces rest against corresponding support surfaces of the holder preferably formed of sintered carbide.

A long and narrow and thin insert has a small moment of inertia with regard to bending stresses caused by heating and consequently the stresses in the insert will be small even at a high temperature.

In a holder according to the invention stresses in the insert will be avoided between the insert has freedom of movement in two directions in the holder. Because of the transfer of heat from the insert to the holder an even temperature will be achieved inside the insert the dimensions of which are suitable for such transfer of heat. The present invention comprises tool holders for turning and planing and for milling cutters and is specially suitable for coarse turning and planing. A large part of the insert length can be used without danger of cracking, breaking and abnormal wear and this also contributes to an even temperature inside the insert. The dimensions and the fastening conditions of the insert make possible a different dilatation for the insert and adjacent parts without any appreciable danger of damage.

Still another advantage with the holder according to the invention which is more fully explained hereinafter is that the tilting moment against the insert at a positive chip angle can be kept small due to its small width.

The narrow insert and the support or supports of sintrede carbide can be regarded together as being a cutting insert with an interchangeable cutting edge. Thus the narrow insert corresponds to the edge part of a conventional insert, which is subjected to wear from the chip, while the support or supports corresponds to the main or backing up part of a conventional insert. A carbide insert generally has a larger width and thickness than is necessary with respect to the wear in order to use the high compressive strength and heat resistance of the carbide for counteracting the high pressures and high temperatures at the cutting edge.

Obviously a diminishing of cost is achieved compared to hitherto known inserts if only the smaller part of the carbide structure which is subjected to wear is interchangeable while the supporting and heat absorbing parts are made permanent. Besides different qualities of sintered carbide can be used for the different parts suitable for the different functions of the parts.

The invention is illustrated in the accompanying drawings in which:

FIG. 1 shows a tool holder according to the invention with clamped insert;

FIG. 2 shows the fore part of a holder shaft with detachable parts removed,

FIG. 3 shows a clamping jaw for the chip breaker,

FIG. 4 shows a clamping jaw for the cutting insert,

FIG. 5 shows a chip breaker,

FIG. 6 shows a cutting insert,

FIG. 7 shows a supporting plate or shim,

Figure 8:
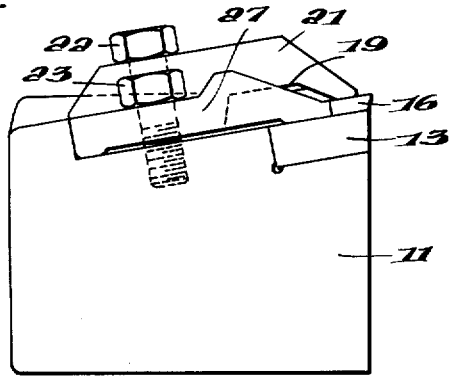
FIGS. 8–10 show alternative embodiments of the tool holder as seen from the insert end.

In the embodiment shown in FIGURES 1–7 the chip breaker and the back support of the insert 16 are made in one piece 18, while the shim or anvil plate 13 is a separate piece. The holder shaft 11 is of the usual type and has a recess 12 (FIGURE 2). In this recess are fastened the cutting insert 16 and the parts supporting the insert, viz., the shim plate 13 and the chip breaker 18, which as stated is a combined chip breaker and back support for the insert. The shim plate 13 is placed in the lower fore part of the recess 12 and is fastened in a suitable way to the shaft 11, e.g. with screws (not shown). In the case shown in FIGURES 1–7 the shim or anvil plate 13 is substantially wider than the cutting insert 16, but this is not necessary, as also an arrangement according to FIGURE 9 in which the insert and the shim are of the same width is possible within the scope of the invention. The chip breaker 18 has the chamfered chip breaker surface 19.

The top surface of the shim plate 13 and the adjacent front surface of the chip breaker 18 should conveniently be plane and the angle between them should be chosen between 45° and 120°. The insert 16 is placed in the elongated recess or groove formed by these surfaces and should have plane contact surfaces resting against the plane surfaces of this elongated recess. Thus the shim plate 13 and the chip breaker 18 form a supporting body in the tool shaft for the cutting insert 16.

The chip breaker 18 is supported at its back directly by the surface 14 of the holder shaft but it is possible to put an insertion between the chip breaker 18 and the shaft or to support the chip breaker on one or several surfaces of the clamping part 20. The chip breaker 18 likewise suitably can be made of sintered carbide. The chip breaker can be made in a separate piece as illustrated or in one piece with the shim plate 13, in which latter case an elongated recess is provided in the combined body 13, 18 for the cutting insert.

The shim or anvil plate 13 is supported by sides 14 and 15 in said recess 12. The shim plate 13 is suitably made of sintered carbide but may in certain cases also be made of steel.

By the expression "sintered carbide" is meant sintered alloys containing one or several carbides such as tungsten carbide, titanium carbide and/or tantalum carbide together with one or several bonding metals such as cobalt. Instead of sintered carbide sintered ceramic products such as oxide of aluminum may be used.

The cutting insert 16 is placed on the shim 13 close to one of the fore edges of the holder shaft. This insert should preferably be made of sintered carbide.

The underside of the insert 16 and the chip breaker 18 are in this embodiment placed in the same plane, but this feature can also be arranged otherwise.

The cutting insert is clamped by a clamping jaw 21 (FIGURES 1 and 4) which grips the insert at one end along a part of its length, so that at least half of the length of the insert is left free for bending and other deformations. Suitably at least two thirds of the insert are left free. The clamping jaw can, as shown, be separate from the holder shaft but it can also be integral with the shaft and in this case resilient with respect to the shaft.

Figure 11:
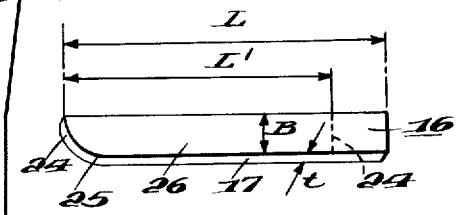
FIG. 11 shows the dimensions of a cutting insert.

In FIGURE 11 is shown an insert with certain dimensions. The total length of the insert is represented by L and the free or unclamped length by $L^1$. The width is represented by B. The limit between the free and the clamped part of the insert is marked 24. The thickness of the insert is represented by the letter t. These dimensions of the insert can be related to each other by the following approximate formulas, which express a convenient form of the insert:

$$0.5(B+1)^2 \leq L^1 \leq 1.5(B+1)^2;$$
$$L > (t+2)^2$$

The dimensions B, L, $L^1$ and t in the formulas are measured in millimeters.

As a general rule the length L of the insert should be more than six times, preferably more than ten times the thickness t and more than four times, preferably more than five times the width B of the insert. In the following table the dimensions of a few inserts which have been used and found to be suitable are given in millimeters.

| Length L | Width B | Thickness t | Clamped length |
|---|---|---|---|
| 40 | 6 | 2.2 | 5 |
| 54 | 7 | 2.6 | 6 |
| 75 | 8 | 3.0 | 7 |

The clamped length is equal to $L—L^1$ according to the definitions given above and in FIGURE 11 and generally is less than 50% and generally from about 8% to about 25% preferably to about 15% of the total length of the insert.

The side cutting edge 17 and the end cutting edge 24 of the insert are connected by a curved edge portion 25. The insert preferably has a uniform cross section along the length. The insert may be provided with side cutting edges and end cutting edge at both ends and both sides, which cutting edges can be used one at a time by turning the insert. 26 is the top face or surface of the insert.

The chip breaker and insert support 18 and the shim 13 are clamped to the holder shaft 11 by the clamping jaw 20 which is separate from the shaft but may be integral therewith. In the latter case the clamping jaw is resiilent in relation to the shaft. As shown the jaw 20 is secured by one or several screws or nuts 23. The clamping jaws 20 and 21 may also be made in one piece and it is in certain cases possible that these jaws or the one combined clamping jaw simultaneously clamps both the chip breaker 18 and the cutting insert 16.

The cutting insert 16 should be made of a more wear-resistant sintered carbide, while the shim plate 13 and the chip breaker and support plate 18 should be made of a tougher sintered carbide. In certain cases the plate 18 can be made of harder material than the shim plate. The variation in wear-resistency and toughness for sintered carbides can, as is well known, be achieved by variation of composition and/or grain size of the carbide used.

Instead of one shim plate 13 it is possible to use two or more plates placed on top of each other in order to make the shim plate partly exchangeable. These plates may if desired be made of different carbide compositions.

In FIGURE 8 is shown an alternative embodiment of a tool holder according to the invention. In this embodiment the holder shaft 11 is made with a recess 12 in the same way as in the embodiment of FIGURE 1 but the chip breaker 18 and the clamping jaw 20 of the embodiment of FIG. 1 are replaced by a unitary member 27 which combines the functions of the members 18 and 20 and provides the chip breaker surface 19. This combined part 27 is fastened by one or several screws 23. The clamping jaw 21 for the cutting insert 16 is, as in FIGURE 1, clamped by a screw 22. The shim plate 13 is, as in FIGURE 1, broader than the insert 16.

Figure 9:
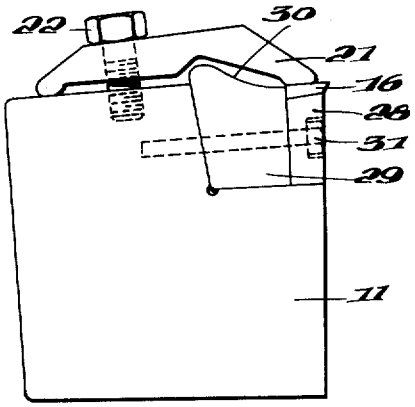

In FIGURE 9 is shown another embodiment in which the shim plate 13 of the embodiments of FIGURES 1 and 8 is substituted by two supporting parts 28 and 29, the fore one of which (28) supports the cutting insert 16, while the back one 29 is made so high that it protrudes along the back of the cutting insert in order to support the insert and take over the function of the above mentioned part 18. Said part 29 is also formed as a chip breaker and has the chip breaker surface 30. The fastening of the cutting insert 16 is here performed in the same way as in the embodiments shown in FIGURES 1 and 8, i.e. by the clampplate 21. The parts 28 and 29 are secured to the holder shaft 11 by one or more screws 31.

Figure 10:
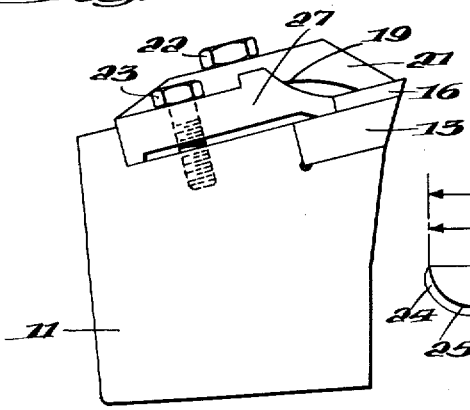

In FIGURE 10 is shown another embodiment, which is rather similar to the one shown in FIGURE 8, but the angles for the cutting insert and for the chip breaker part are to a certain extent different from the ones in FIGURE 8. The parts are so similar that the same reference numerals are used.

One of the advantages above mentioned of the tool holder-cutting insert combination according to the invention is that the cutting insert is clamped exclusively above the maximal cutting depth and the insert due to its small width is subjected to only a very small tilting moment even at the beginning of the working operation, when a comparatively horizontal force is working against the cutting insert according to FIGURE 1. Each different part in the holder can be made detachable and exchangeable, and it will be possible for different working purposes to change the cutting insert, the chip breaker etc. In the shown embodiments the rake angle is positive, but it may sometimes be negative.

The above described embodiments are only arbitrarily chosen within the scope of the following claims and can of course be varied in many ways.

I claim:

1. A tool holder and cutting insert combination comprising a tool holder shaft having a first recess therein, an insert supporting body in said first recess, said supporting body consisting of [at least two parts] at least one *part* [of] which is harder than said holder shaft, [said parts of] said supporting body forming an elongated second recess having a bottom surface and a rear surface at an angle of from 45° to 120° to said bottom surface, an elongated cutting insert consisting of a sintered carbide that is harder than any part of said supporting body positioned lengthwise in said elongated second recess, means associated with said shaft [for mechanically] *rigidly* clamping said supporting body in said first recess, independent means associated with said shaft for mechanically clamping said insert in said elongated second recess, said insert having a length which is more than four times the width thereof and a width which is more than one and one-half times the thickness thereof, said means for mechanically clamping said insert in said elongated second recess engaging only an end portion of said insert amounting to less than a third of the total length thereof, said insert having a cutting edge on the front surface of at least the unclamped portion thereof, and at least that portion of the cutting insert having said cutting edge having two adjacent surfaces supported respectively by the said bottom surface and the said rear surface of the said elongated second recess.

2. A tool holder and cutting insert combination as defined in claim 1 in which the clamped end of the cutting insert is positioned against an end surface of the recess in the tool holder shaft.

3. A tool holder and cutting insert combination as defined in claim 1 in which the supporting body consists of a detachable shim member positioned in said first recess in the tool holder shaft between the bottom of the cutting insert and the bottom surface of said first recess, and a detachable chip breaker positioned rearwardly of said insert and providing a support for the rear surface thereof, said shim member consisting of a sintered carbide that is harder than said holder shaft [but less hard than said insert].

References Cited in the file of this patent or the original patent

UNITED STATES PATENTS

| | | |
|---|---|---|
| 1,700,610 | Drees | Jan. 29, 1929 |
| 2,425,242 | Herring | Aug. 5, 1947 |
| 2,595,090 | Middleton | Apr. 29, 1952 |
| 2,641,048 | Vreeland | June 9, 1953 |
| 2,734,256 | Forward | Feb. 14, 1956 |
| 2,865,084 | Wendt | Dec. 23, 1958 |
| 2,887,760 | Armstrong | May 26, 1959 |
| 2,912,744 | Proksa | Nov. 17, 1959 |

FOREIGN PATENTS

| | | |
|---|---|---|
| 704,143 | France | Feb. 17, 1931 |
| 989,306 | France | May 23, 1951 |